Dec. 26, 1950 K. TOENSFELDT 2,535,569
CONTROL MEANS FOR ELECTRIC STEAM GENERATORS
Filed Dec. 23, 1947
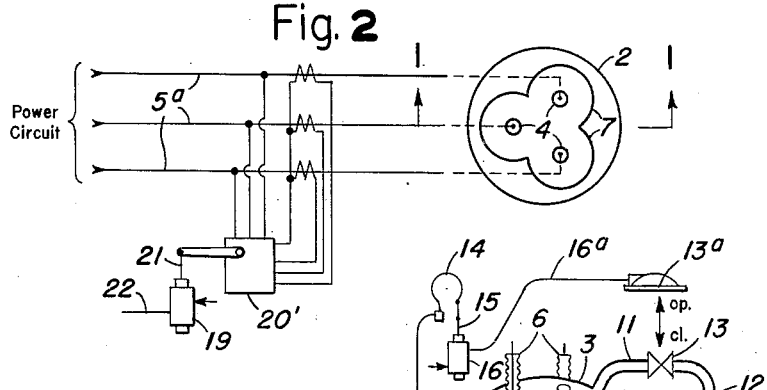
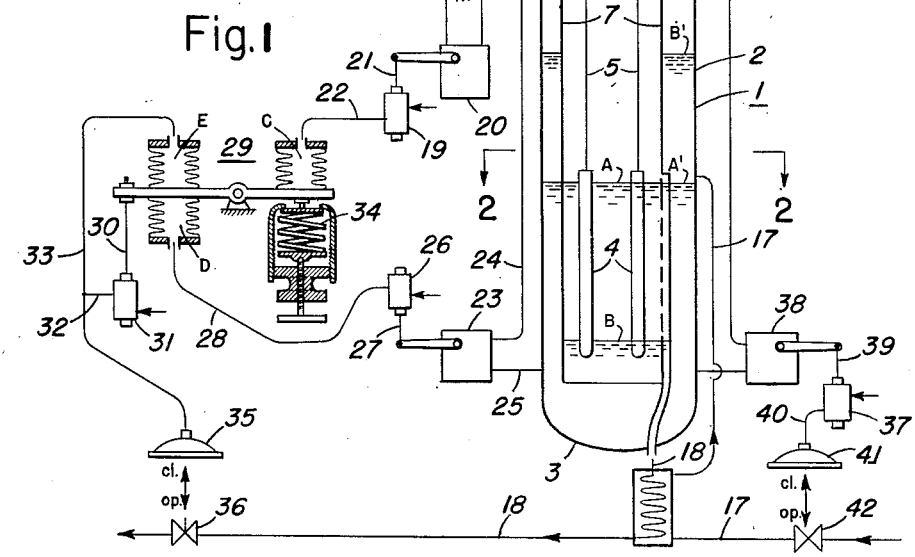
INVENTOR.
Kurt Toensfeldt Patented Dec. 26, 1950

2,535,569

UNITED STATES PATENT OFFICE 2,535,569

CONTROL MEANS FOR ELECTRIC STEAM GENERATORS

Kurt Toensfeldt, Port Washington, N. Y., assignor to Combustion Engineering-Superheater, Inc., a corporation of Delaware Application December 23, 1947, Serial No. 793,485

7 Claims. (Cl. 219—40)

1

This invention relates to electric steam generators of the water-immersed electrode type and particularly to improved means for automatically controlling the conductivity of the water and the flow of feed water to the generator.

In electric boilers the current flows through the water between electrodes immersed therein and generates heat which is converted to steam by evaporating the water. For a constant voltage, the rate at which heat is generated will depend upon the flow of electric current through the water. At the same water temperature the current flow varies directly with the conductivity of the water and this varies with the concentration of salts in solution. With a substantially constant concentration of salts maintained in the boiler water, the current flow thus will depend upon the depth of the immersion of the electrodes.

The water in the generator contains both the heat equivalent to the steam pressure and the desirable concentration of salts. To avoid wasting this water when it is withdrawn from the generator so as to reduce the immersion of the electrodes, a surge or storage chamber is provided in which the excess water is temporarily stored.

An object of this invention is to provide electric steam generators having auxiliary storage chambers with improved control means effective to maintain a substantially constant volume of water within the generator and chamber for any and all loads.

Another object is to provide improved means for determining the conductivity of the generator water being converted into steam.

A further object is to provide electric steam generators with improved control means for maintaining a substantially constant conductivity of the water being vaporized within the generator.

Additional objects of the invention will appear from the following description of illustrative embodiments of the invention when read in conjunction with the accompanying drawings wherein:

Figure 1 is a sectional diagrammatic view in elevation (on line 1—1 of Figure 2) of an electric steam generator showing the control means according to the invention;

Figure 2 is a sectional view taken on line 2—2 of Figure 1 and further showing power circuit conductors connected with the generator electrodes; and Figure 3 is a group of curves diagramming the pressures, at various loads, within the various pressure responsive relay elements that control

2 the positioning of the bleed valve to accomplish conductivity regulation.

In my copending application Serial No. 788,356 entitled "Electric Steam Generator and Control Means Therefor" and filed November 28, 1947, I have disclosed novel means for controlling the electrode immersion in storage-chamber type electric steam generators in response to a pressure variation resulting from the quantity of steam demanded from the generator. In the same case I have also disclosed an improved generator having a surge or storage space disposed within the main generator drum and made sufficient to accommodate all storage water displaced from the space surrounding the electrodes in going from full to minimum load. Such a generator is shown by Figures 1 and 2 in simplified diagrammatic form.

This generator 1 comprises a cylindrical shell 2 having dished heads 3 fastened thereto forming a pressure vessel. Suspended within the generator 1 are electrodes 4, in this case three in number, the electrodes being hung from conductor members 5 which pass through insulators 6 in the drum head 3 and the conductors 5 are connected at their upper ends to a source of electric power as through circuit conductors designated 5a in Figure 2. Surrounding the electrodes 4 are neutral plates 7 equally spaced from the electrodes and forming a clover leaf structure in cross section as shown at 7 in Figure 2. The clover leaf formed by neutral plates 7 is open at the bottom and forms a seal at the top with the plate 8 which closes off the top of the space between the neutral plates 7 and the generator shell 2.

The generator interior is thereby divided into two chambers, one within and the other outside of the clover leaf structure. The chambers communicate at the bottom below the clover leaf so that water may pass from one chamber to the other around the bottom of the clover leaf. A steam offtake 9 and a steam connection 10 are connected to the top of the outer chamber. A steam offtake 11 is connected into the top of the chamber within the clover leaf and a pipe 12 connects offtake 11 with steam connection 10. Within pipe 12 is a throttle valve 13 operated by a diaphragm motor device 13a that closes or opens the valve in response to the rise and fall, respectively, of the steam pressure in the offtake pipe 9.

The named control of throttle valve 13 in response to steam pressure may be by Bourdon gauge 14 connected into offtake 9 and acting on the stem 15 of an air control valve 16. Air under pressure enters valve 16 as shown by the arrow and is impressed via tube 16a on the diaphragm 13a of throttle valve 13 at a pressure determined by the steam pressure leaving the generator.

Feed water is supplied into the outer chamber surrounding the clover leaf 7 by connection 17 at a location well above the bottom of the clover leaf. The feed water traveling downwardly through said chamber becomes heated to steam temperature before entering the chamber within the clover leaf 7 in which steam generation takes place. A bleeder connection 18 is provided from the bottom of the generator through which water (preferably from the clover leaf interior) is withdrawn to maintain the concentration of salts and the conductivity of the water within the generator at a desired value.

In operation the generator 1 is first filled with water to the level A, and due to initial lack of pressure in steam offtake 9 the diaphragm motor 13a holds throttle valve 13 in wide open position. Upon delivering electric current to the immersed electrodes 4 steam will be generated within the inner vaporizing chamber, and when full flow of steam passes through the pipe 12 the inner-chamber water level A within the clover leaf 7 is about at the level A' of the outer-chamber water surrounding the clover leaf. The throttle valve 13 is now wide open and offers substantially no resistance to the steam flow into the upper portion of the outer chamber and thence therefrom via offtake 9. Under this condition both generator chambers are under about the same steam pressure.

With full-load steam demand on the generator the electrodes 4 are fully immersed to approximately level A. As the steam demand decreases the discharge flow rate through offtake 9 drops and the fully immersed electrodes then generate too much steam so that the pressure in the steam offtake 9 rises. The diaphragm 13a for valve 13 responds to this pressure rise by inflating and partly closing valve 13. Such partial closure raises the resistance of the valve to steam flow through connection 12 into the outer or storage chamber surrounding the clover leaf, increases the steam pressure within the vaporizing chamber inside the clover leaf, and thereby depresses the water level within the clover leaf to a level below A. Further rise in steam pressure in offtake 9 and subsequent throttling by valve 13 continues to depress the water within the clover leaf until the portion of the electrodes 4 remaining immersed generate only sufficient steam to maintain the slightly increased pressure in offtake 9 and a balance is established.

The depressed water level within the clover leaf displaces vaporizing chamber water into the storage space around the clover leaf and causes a rise in the outer chamber water level there. The head representing the difference in water levels around and within the clover leaf is a measure of the steam-flow resistance introduced by the throttle valve or damper 13. With minimum steam load on the generator the maximum depression of the water within the clover leaf is typified by low level B (see Figure 1) and the corresponding level around the clover leaf is typified by high level B'.

As the generator steam load again increases the immersion-adjusting operations described above take place in reverse. With increased steam demand the pressure in the steam offtake 9 falls, the diaphragm 13a deflates and opens throttle valve 13, the resistance to steam flow through that valve falls and the water level within the clover leaf 7 rises, while the water level surrounding the clover leaf falls. The resultant greater immersion of the electrodes 4 generates more steam until a balance again occurs where the rate of steam generation by the electrodes is just sufficient to maintain the slightly decreased pressure in offtake 9.

The foregoing unique form of generator construction and electrode-immersion control is disclosed and claimed by my co-pending application Serial No. 788,356 earlier identified, and the here-repeated description thereof has been given as an introduction to the further feed-water and conductivity control improvements of my present invention. Such further improvements will now be described.

In order to fully utilize the storage space of the Figure 1-2 generator effectively at all ratings and particularly at maximum rating, it is necessary to maintain a substantially constant volume of water within the generator. To accomplish this, means must be provided to feed water into the generator in amount equal to the steam offtake plus bleed. Furthermore, the conductivity of the water within the generator should preferably be maintained substantially constant so that steam generated will be proportional to electrode immersion and that maximum output may be realized with maximum electrode immersion.

With the conductivity maintained substantially constant, and constant steam pressure and a constant water volume, the water level in the storage space of my improved generator will rise proportionately to the fall in water level surrounding the electrodes 4 or to the electrode immersion, or to the steam output. Under these conditions, either the water level around the electrodes 4 or that around the clover leaf will provide a direct measure of the feed water required by the generator. I prefer means responsive to the water level around the clover leaf to regulate a feed water control valve for reasons to be discussed later.

With constant conductivity the electrode immersion or water level therearound is a measure of the generator's electrical power input (usually expressed in kilowatts, hereinafter referred to as "KW"). This KW input furnishes the heat imparted to the steam leaving the generator plus the heat supplied for radiation loss and heat lost in the bleed. These last losses consume heat which is not measured by steam flow from the generator. Measurement and control of conductivity may then be effected through means responsive to the ratio of the water level around the electrodes to the KW input (Figure 1 modified by Figure 2), or to the steam flow (Figure 1 unmodified) plus an amount which approximates the steam equivalent to the heat required for the remaining losses from the generator. A properly controlled flow of feed water into the generator likewise may be used (though not here so shown) in place of the steam flow or KW input.

Such conductivity control means responsive to the ratio of electrode immersion to offtake steam flow are diagrammed in Fig 1 on the left side of generator 1 earlier described. This new conductivity control of Figure 1 comprises a first pneumatic pilot valve 19 and a steam flow measuring device 20, the latter positioning the valve 19 through stem 21 so as to establish in the pipe 22 an air pressure substantially directly proportioned to the weight of steam flowing through steam offtake 9. Obviously the steam flow measuring device may be mounted in connection 12 between the electrode and storage chambers. A water level measuring device 23, connected to the generator by tubes 24 and 25 (and responsive to the generator's inner or vaporizing chamber water level), positions a second pilot valve 26 through stem 27 so as to establish in the pipe 28 an air pressure substantially inversely proportional to the water level surrounding the electrodes. Both pilot valves 19 and 26 receive air under pressure through pipes shown by the arrows from a source not shown.

Pipes 22 and 28 are respectively connected to the bellows chambers C and D of a relay 29 and their added air pressures are applied to the stem 30 of a third pilot valve 31 in an upward direction to cause a rise in air pressure in pipes 32, 33 and chamber E. These combined pressures in chambers C and D are opposed by spring 34 and any pressure that exists in chamber E. The pressure in chamber E is determined by the relative position of pilot valve stem 30. Pilot valve 31 receives air under pressure, as shown by the arrow, from a source not shown. A pipe 33 connects chamber E to the diaphragm 35 of a bleed valve 36 which bleeds water from the generator through bleed pipe 18 so as to maintain a desired conductivity therein.

In operation of this conductivity control system (referring to Figures 1 and 3) the pressure gradients in chambers C and D are selected so that with increase in steam output the rise in pressure in chamber C exceeds the fall in chamber D resulting in an upward movement in valve stem 30 and a rise in pressure in chamber E which is impressed on diaphragm 35 of bleed valve 36. The sum of pressures in chambers C and D minus the pressure in chamber E equals the loading of spring 34 (T, Figure 3) and there is a corresponding value of the pressure in chamber E for each sum of pressures in chambers C and D. If, at a given load or steam flow (say at C, Figure 3), the conductivity of the water should rise or fall from normal, the water level surrounding the electrodes will respectively fall or rise from the normal (D, Figure 3) and the respective pressure in chamber D will rise or fall (say to D' or D'', Figure 3). Also the sum of pressures in chambers C and D (C being constant) will correspondingly rise or fall with the change in D (to C plus D', or to C plus D'', Figure 3), and the load on spring 34 will tend to rise or fall (to T' or T'', Figure 3) to compress or expand the spring. Consequently valve stem 30 will correspondingly raise or lower the pressure in chamber E (to E' or E'', Figure 3) from the normal (E, Figure 3) and thereby open or close the bleed valve 36 from normal. The pressures E', E'', are those where C plus D' less E' and C plus D'' less E'', each strikes a balance with the spring loading located on line T in Figure 3.

Accordingly, at a given generator load or steam flow, if the water conductivity rises or falls from normal the control will bleed respectively more or less water than normal from the steam generator until a balance is reestablished either to normal, or to a point where a new higher or lower conductivity maintains a little lower or higher than normal water level around the electrodes to compensate for an abnormal respectively low or high conductivity of the feed water entering the generator.

Assuming proper conductivity of the generator water, should the electrodes 4 become coated so as to increase the resistance to current flow, the water level surrounding the electrodes will rise above normal and similar conditions then prevail as when the conductivity falls. The bleed valve 36 will have closed below normal, built up the conductivity and lowered the water level surrounding the electrodes, and conditions will have stabilized at a rate of bleed below normal, a lowered water level but above normal, and a conductivity above normal.

When the bleed valve 36 withdraws slightly more than normal water at a given load or steam flow, the conductivity will fall, the water level surrounding the electrodes will rise above normal and the bleed valve will close and build up the conductivity. The reverse will occur with less than normal bleed through the valve.

If desired, the conductivity control system of Figure 1 may be modified by replacing the steam offtake indicator 20 by the electrical power input indicator 20' of Figure 2. Such substitution becomes possible because the flow of generated steam through offtake 9 is a close measure of the water-vaporizing power supplied to electrodes 4 through electrical input circuit 5a. In the event of such substitution, operation (of air valve 19 and other system parts) equivalent to that just described again takes place.

To control the flow of feed water to the Figure 1–2 generator means are employed which are responsive to the water level in the outer storage space around the clover leaf. The feed water control means shown diagrammatically to the right of the generator in Figure 1 comprise a pilot valve 37 and a water level measuring device 38, the latter positioning the valve 37 through stem 39 so as to establish in the pipe 40 an air pressure substantially inversely proportional to the water level within the storage space around the clover leaf. Pilot valve 37 receives air under pressure through a pipe indicated by the arrow from a source not shown. This pressure in pipe 40 is impressed onto diaphragm adjuster 41 for feed valve 42 to open the valve when the storage water level falls and to close it when said water level rises.

In operation of this feed water control system, the feed valve 42 is adjusted to uniformly increase the feed water flow to the generator in proportion to the steam output from minimum load at level B' in the storage space around the clover leaf to maximum load at level A' therein. This flow of feed water includes the water normally bled from the generator through valve 36. Under normal conditions of conductivity and electrode cleanliness, the outer-chamber water level around the clover leaf 7 rises proportionately to the fall in inner-chamber water level within the clover leaf.

Should the inner level change from normal due to causes discussed above, the outer level will, irrespective of the inner level, always seek that particular elevation where the feed water flows equals the steam flow plus bleed. The generator may then under certain conditions have somewhat more or less water in it than normal.

In any conductivity control means that may be employed, any departure of conductivity in the generator water from the normal will cause a variation in quantity of bleed water from normal and therewith the quantity of feed water from normal. Consequently any means for controlling the feed water cannot satisfactorily respond to steam flow alone. Since the electrode water level is fixed by the steam throttle valve 13, above, below, or at normal level, it cannot satisfactorily serve as a guide for the feed water control.

The only remaining satisfactory guide for feed water control is the storage water level which promptly follows the electrode water level with change in load and is additionally free to seek that particular level where the setting of the feed valve 42 will supply feed water plus bleed water in the proper amount. The storage water level is then the major or ultimate determining control for the feed water, irrespective of any other influencing controls. Furthermore, the storage water in the outer chamber is substantially free from steam bubbles and does not swell with sudden increases in load and therefore requires no compensating correction for the water level.

As mentioned above, if desired, the conductivity control system of Figure 1 may be modified by replacing the steam offtake indicator 20 by a storage water level indicator, such as indicator 38. Such substitution becomes possible because said water level is substantially an inversely proportional measure of the flow of steam. The storage water level indicator 38 will then cooperate with the electrode water level indicator 23 to regulate the bleed valve 36 for conductivity control and furthermore may simultaneously be used to regulate the feed water valve 42. Obviously other water level measuring means may be similarly employed to control the bleed and feed valves.

From the foregoing it will be evident that there is a cooperating action between all of the controls herein described. The positioning of the steam throttle valve 13 in response to steam pressure (steam flow) determines the inner-chamber water level surrounding the electrodes, whatever the conductivity of the water in the generator may be or the condition of the electrodes. The conductivity control for adjusting bleed valve 36 measures the water level as established by the steam throttle valve, with respect to its normal position, and if at variance promptly starts to correct the conductivity and thereby brings the water level back to normal or near normal. The feed water valve 42 is controlled to feed water into the generator in amount equal to the steam output plus bleed water, and maintains a substantially constant volume of water in the generator by maintaining the water level within the outer storage space outside of the clover leaf in substantial inverse proportional elevation to the variation of water level within the clover leaf as established by the steam throttle valve 13.

While the preferred embodiments of my invention have been shown and described, it will be understood that the use of equivalents may be employed and changes in construction, combination and arrangement of parts may be made without departing from the spirit and scope of the invention as claimed.

I claim:

1. In an electric steam generator, a vaporizing chamber, a water-heating electrode within that chamber immersed to a depth dependent upon the chamber water level, a storage chamber separate from said vaporizing chamber but in water-interchange communication therewith, a steam connection from the vaporizing chamber steam space to the storage chamber steam space and a steam offtake from the latter, throttling means in said steam connection responsive to the steam pressure in one of said two chambers for creating upon the water levels of said chambers a pressure difference which governs the vaporizing chamber water level in a way causing the electrode immersion and hence rate of steam generation to match the rate of steam discharge through said offtake, a feed water connection to the generator, a feed water admission valve in that connection, and means responsive to the water level in one of said two generator chambers for controlling the opening of said feed valve.

2. In an electric steam generator, a vaporizing chamber, a water-heating electrode within that chamber immersed to a depth dependent upon the chamber water level, a storage chamber separate from said vaporizing chamber but in water-interchange communication therewith, a steam connection from the vaporizing chamber steam space to the storage chamber steam space and a steam offtake from the latter, throttling means in said steam connection responsive to the steam pressure in one of said two chambers for governing the vaporizing chamber water level in a way causing the electrode immersion and hence rate of steam generation to match the rate of steam discharge through said offtake, a feed water connection to the generator, a feed water admission valve in that connection, and feed valve adjusting means responsive to the water level in said storage chamber for increasing the feed water flow as said level falls and for decreasing that flow as said level rises.

3. In an electric steam generator, a vaporizing chamber, a water-heating electrode within that chamber immersed to a depth dependent upon the chamber water level, a storage chamber separate from said vaporizing chamber but in water-interchange communication therewith, a steam connection from the vaporizing chamber steam space to the storage chamber steam space and a steam offtake from the latter, throttling means in said steam connection responsive to the steam pressure in one of said two chambers for governing the vaporizing chamber water level in a way causing the electrode immersion and hence rate of steam generation to match the rate of steam discharge through said offtake, and means for regulating the conductivity of the water within said generator comprising a bleed connection from the generator, a valve in said connection for controlling the rate at which bleed water is withdrawn through that connection, bleed valve adjusting means effective to open said valve as the conductivity of the water within said vaporizing chamber increases and effective to close same as said conductivity decreases, a feed water connection to the generator, a feed water admission valve in that connection, and means responsive to the water level in one of said two generator chambers for controlling the opening of said feed valve.

4. In an electric steam generator, a vaporizing chamber, a water-heating electrode within that chamber immersed to a depth dependent upon the chamber water level, a storage chamber separate from said vaporizing chamber but in water-interchange communication therewith, a steam connection from the vaporizing chamber steam space to the storage chamber steam space plus a steam offtake from the latter, throttling means in said steam connection responsive to the steam pressure in one of said two chambers for governing the vaporizing chamber water level in a way causing the electrode immersion and hence rate of steam generation to match the rate of steam discharge through said offtake, and means for regulating the conductivity of the water within said generator comprising a bleed connection from one of said two generator chambers, a valve in said connection for controlling the rate at which bleed water is withdrawn from the generator, bleed valve adjusting means for opening said valve as the conductivity of the water within said vaporizing chamber increases and for closing same as said conductivity decreases, a feed water connection to the generator, a feed water admission valve in that connection, and feed valve adjusting means responsive to the water level in said storage chamber for increasing the feed water flow as said level falls and for decreasing that flow as said level rises.

5. In an electric steam generator comprising a chamber for containing water to be vaporized, an electrode immersed in said water to a depth dependent upon the chamber water level, power circuit means for passing heating current through said water by way of said electrode, and an offtake through which the steam vaporized by said current leaves the generator, the combination of means for detecting changes in the electrical conductivity of said water within the generator comprising a first indicator responsive only to the immersion of said electrode by said water, a second indicator responsive only to the waterheating power supplied to said electrode by said circuit means, and apparatus jointly responsive only to said first and second indicators for registering whether said water conductivity is at, above or below normal.

6. Control means for maintaining substantially normal the conductivity of the water within an electric steam generator of the water-immersed electrode type comprising a bleed connection from the generator provided with a throttling valve for controlling the amount of water bled from the generator, a first indicator responsive only to the electrical power input to the generator, a second indicator responsive only to the electrode water level, and apparatus responsive only to both said electrical power input and said water level indicators to open said bleed valve with increase and close with decrease in conductivity from normal while operating said bleed valve to open proportionately with said electrical power input at normal conductivity.

7. Control means for regulating the conductivity of the water within an electric steam generator of the water-immersed electrode type comprising a bleed connection from the generator provided with a throttling valve for controlling the amount of water bled from the generator, and means responsive only to the electrode water level and a measure of the feed water flow to the generator for operating said bleed valve to open proportionately with said flow and water level at normal conductivity and to further open with increase and to close with decrease in conductivity from said normal.

KURT TOENSFELDT.

REFERENCES CITED

The following references are of record in the file of this patent:

UNITED STATES PATENTS

| Number | Name | Date |
| --- | --- | --- |
| 1,902,842 | Eaton | Mar. 28, 1933 |
| 2,006,631 | Eaton | July 2, 1935 |
| 2,185,786 | Eaton | Jan. 2, 1940 |
| 2,447,295 | Vickery | Aug. 17, 1948 |
| 2,485,999 | Birchler et al. | Oct. 25, 1949 |